(No Model.)
T. BARBER.
TOOL HOLDER.
No. 364,080. Patented May 31, 1887.
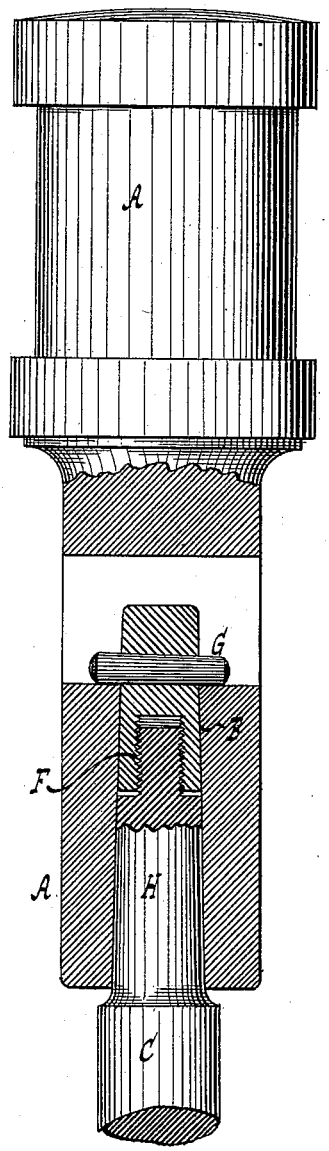
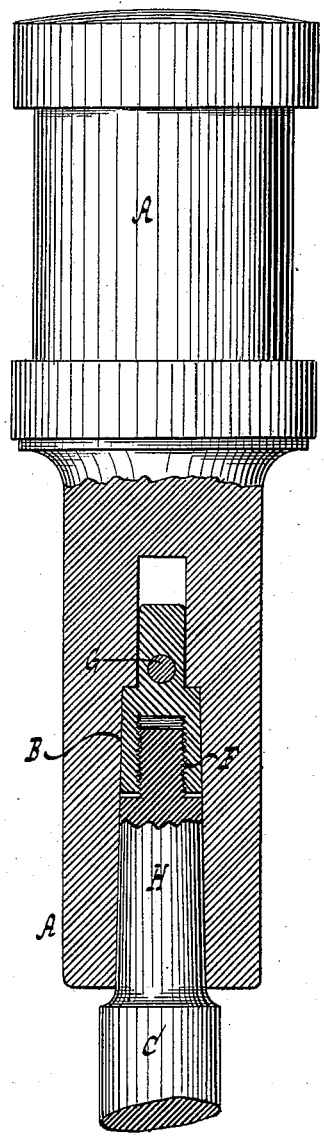
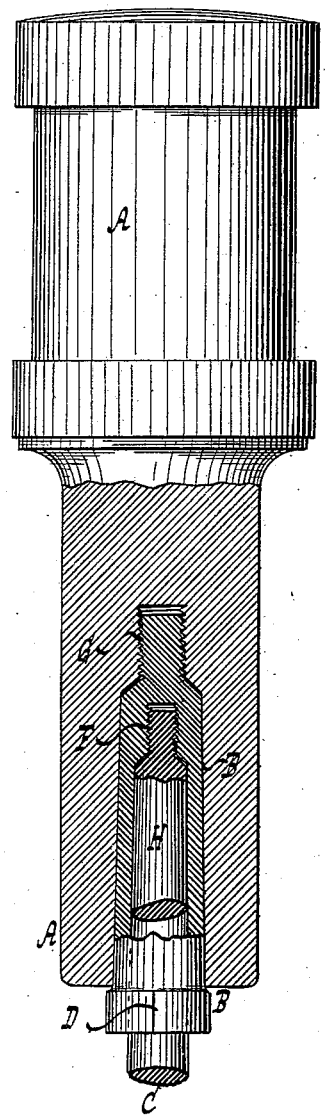
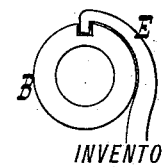
WITNESSES:
William L. Miller
Edward Wolff
INVENTOR
Thomas Barber
BY
Van Santvoord & Hauff
ATTORNEYS

UNITED STATES PATENT OFFICE.

THOMAS BARBER, OF FLATBUSH, NEW YORK.

TOOL-HOLDER.

SPECIFICATION forming part of Letters Patent No. 364,080, dated May 31, 1887.

Application filed February 10, 1887. Serial No. 227,140. (No model.)

*To all whom it may concern:*

Be it known that I, THOMAS BARBER, a citizen of the United States, residing at Flatbush, in the county of Kings and State of New York, have invented new and useful Improvements in Tool-Holders, of which the following is a specification.

This invention relates to improvements in tool-holders, as set forth in the following specification and claims, and illustrated in the accompanying drawings, in which—

Figure 1 is a front elevation, partly in section, of a tool-holder. Fig. 2 is a side elevation, partly in section, of the holder shown in Fig. 1. Fig. 3 is a side elevation, partly in section, of a modification. Fig. 4 shows an application of a wrench to a chuck.

Similar letters indicate corresponding parts.

In the drawings, the letter A indicates a tool-holder or spindle. The holder A is adapted for the reception of a chuck, B. A retaining device, G, retains the chuck B in position in the holder A. The retaining device G may be variously formed. For example, in Figs. 1 and 2 the retaining device G is shown as consisting of a pin, G, resting in suitable apertures in the holder A and chuck B. In Fig. 3 the retaining device G consists of a screw-thread on the chuck B engaging a corresponding screw-thread on the holder A. The holder A is provided with a suitable recess or chamber, as shown, for receiving and holding the chuck B. The retaining device G retains the chuck B in the recess or chamber provided for the chuck B in the holder A. The chuck B is tapped or provided with a screw-thread, F, adapted to engage a corresponding screw-thread on the shank H of a tool, C. The shank H is tapered, and sits snugly into a chamber or recess provided for the shank H, either in the holder A, Figs. 1 and 2, or in the chuck B, Fig. 3. The tool C is thus held steadily and securely to the holder A. The tool C may be a drill or boring-bar, or any other suitable tool—as, for example, a spindle on a lathe center. To remove the chuck B from the holder A in the case of Figs. 1 and 2, the pin G is removed from the chuck B, when said chuck B is left free to be withdrawn from the holder A.

In Fig. 3 the free end of the chuck B extends beyond the holder A, and said free end is adapted for the reception of a suitable tool, such as a wrench, E. A recess, D, in the free end of the chuck B is provided for engagement with the wrench E. By having the shank H tapered and a screw-thread at the small end of the shank said shank H is tightly drawn into its seat by the screw-thread at the small end of the shank H engaging the screw-thread F of the chuck B.

What I claim as new, and desire to secure by Letters Patent, is—

1. The combination, with a tool, C, having a tapering shank, H, and a screw-thread at the small end of said shank, of a holder, A, provided with a recess for receiving the shank H, said holder A having a chuck, B, provided with a screw-thread for receiving the screw-thread of the shank H, substantially as set forth.

2. The combination, with a tool, C, having a tapering shank, H, and a screw-thread at the small end of said shank, of a holder, A, having a chuck, B, provided with a screw-thread for receiving the screw-thread of the shank H, and a retaining device, G, for connecting the chuck and the holder, substantially as set forth.

3. The combination, with a tool, C, having a tapering shank, H, and a screw-thread at the small end of said shank, of a holder, A, having a chuck, B, said chuck being provided with a chamber for receiving the shank H, and with a screw-thread, F, adapted to engage the screw-thread of the shank H, substantially as set forth.

In testimony whereof I have hereunto set my hand and seal in the presence of two subscribing witnesses.

THOMAS BARBER. [L. S.]

Witnesses:
W. HAUFF,
E. F. KASTENHUBER.